Feb. 9, 1965  H. NASSENSTEIN  3,169,163
ELECTRO-OPTICAL LIGHT VALVE UTILIZING
CHARGED PARTICLE MIGRATION
Filed March 25, 1959  2 Sheets-Sheet 2
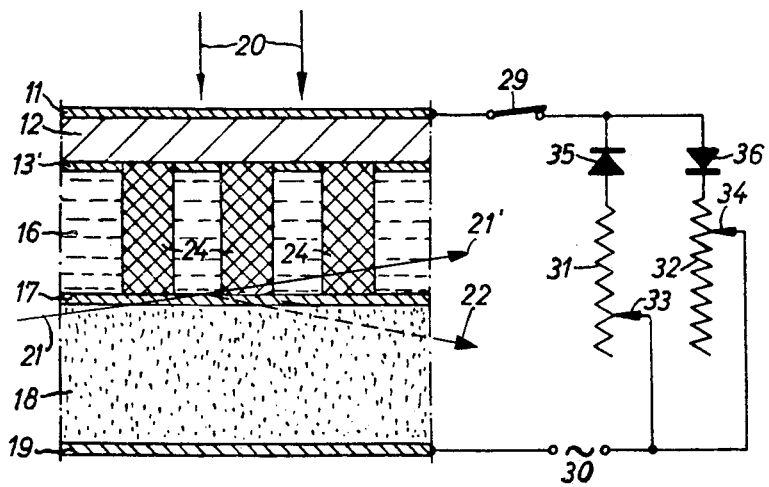
Fig. 4
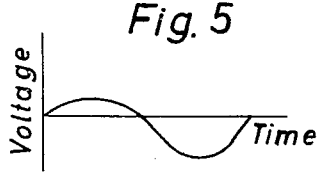
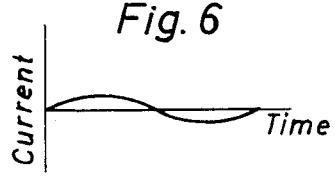
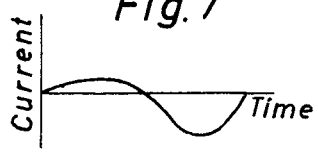
INVENTOR.
BY Dr. HEINRICH NASSENSTEIN 3,169,163
ELECTRO-OPTICAL LIGHT VALVE UTILIZING
CHARGED PARTICLE MIGRATION
Heinrich Nassenstein, Opladen, Germany, assignor to
Firma Agfa Aktiengesellschaft, Leverkusen-Bayerwerk,
Germany
Filed Mar. 25, 1959, Ser. No. 801,955
Claims priority, application Germany, Oct. 19, 1957,
F 24,221; Mar. 27, 1958, F 25,354
23 Claims. (Cl. 88—61)

This application is a continuation-in-part of my copending application, Serial No. 768,393, filed on October 20, 1958, now abandoned.

The present application relates to electro-optic devices, and more particularly to an electrically actuated device for varying a beam of light.

It has been known to utilize the influence of an electric field on a liquid to control the transmission of polarized light through the liquid by the Kerr effect.

It has now been found that liquids may serve to control the intensity and direction of a light beam by changing the concentration of a dissolved material in a liquid by applying an electric field to electrodes or membranes immersed in a liquid, one component of which is capable of migrating in the liquid from one point to another under the influence of an electric field and has an index of refraction different from that of the remainder of the liquid.

It has now been found that the refractive index of a medium of the type described above in the area adjacent electrodes or membranes is particularly sensitive to changes in concentration of one component in said medium, which, for example, may be a solvent and a solute, a dispersing phase and a dispersed phase. The area adjacent an electrode or membrane in the body of liquid in which optical properties are altered by changes in concentration of a component induced by an electric field, will hereinafter be referred to as a "control layer."

The changes in the optical properties of a control layer in an electric field which are caused by different rates of migration of two components of the liquid leading to different relative concentrations in the control layer may be made visible and utilized in a variety of ways, such as, by the schlieren method, by phase contrast, by a dark field arrangement, or by the change from total reflection of a beam of light to non-reflection or partial reflection thereof, or vice versa.

When one of the first three methods is employed for utilizing the change in light deflecting properties of a control layer, a light beam may be passed through the control layer either once or repeatedly, the light beam being reflected towards the control layer by suitable reflector means between individual passages. When the last-mentioned method is employed, conditions are selected in such a manner that the concentration change in the control layer induced by application of an electric field, either creates or destroys optical properties of the control layer which cause total reflection of light in the layer. It is possible for this purpose to utilize either an increase or a decrease in the concentration of a dissolved or dispersed component in a solvent or dispersing medium. Systems suitable for such a purpose include aqueous and non-aqueous, true or colloidal solutions of electrolytes, macromolecular substances, dye-stuffs, and generally disperse systems of soluble or solubilized materials, or gels or sols.

Maximum changes in optical properties of the control layer are achieved if the refractive index of the dispersed material, and such a dispersed material is understood to include not only colloids but also solutions of partly or completely ionized electrolytes, differs as much as possible from that of the dispersing medium, and this term is understood to include a solvent. It is furthermore desirable that the initial concentration of the dispersed material be as high as possible so that the overall index of refraction of the dispersion of the dispersed material in the dispersing medium, wherein the term "dispersion" will include a solution of a solute in a solvent, differ as much as possible from that of the dispersing medium. In order to reduce the amount of electrical energy required for achieving the desired electro-optic effect, it is advantageous that the amount of dispersed material transported by a given unit of electric charge or current be as great as possible.

The beam of light which is to be controlled by the control layer need not have a wave length within the visible electromagnetic spectrum.

The time required for achieving the desired change of concentration of the dispersed component in the control layer is a function of the intensity of the applied electrical field, of the mobility of the individual dispersed particles, and of the thickness of the control layer, the concentration of which is to be changed. For changing the direction of a light beam from that of transmittance through the control layer to that of total reflection, it is generally adequate that the control layer have an effective thickness of about 1 wave length of the light to be controlled.

The mobility of the dispersed particles is at least of the order of magnitude of $1\mu$ per sec. for a potential drop of 1 volt per cm., but is frequently substantially greater. Maximum strength of the electric field is of an order of magnitude of $10^5$ volts per cm. Combining these figures with a thickness of the control layer of $1\mu$, one arrives at a time delay of $10^{-5}$ seconds or less after application of the electric field for complete reversal of the light beam from a direction of transmission to a direction of total reflection. When the electric potential has been disconnected, the induced concentration changes may be cancelled by diffusion, either spontaneous or induced by ultrasonic agitation, or by electric pulses applied in a reversed direction.

The refractive index of a concentrated dispersed system may differ from the refractive index of the pure dispersion medium or solvent by a value of $n=0.1$ or $0.2$. When current is passed through a concentrated aqueous solution having an index of refraction of 1.5, passage of current will reduce the refractive index of the control layer to that of pure water, that is, to 1.33 corresponding to a limiting angle of incidence of 63°. The difference in the length of the optical path which determines the phase contrast is a function of the thickness $d$ of the layer and amounts to $n.d$, which, for a value of $n=0.2$ and $d=1\mu=10^{-4}$ cm., amounts to $0.2\mu$, which, for a wave length of 600 m$\mu$, is ⅓ of a wave length. This difference in length of the optical path is entirely adequate for controlling the change of direction of the light when determined by phase contrast.

The amount of electrical energy for each occurrence of the electro-optic effect is a function of the specific resistance of the system, of the area of the control layer, that is, the surface area of the electrode or membrane in contact with the control layer, and the applied potential which, for a given field intensity, depends on the electrode spacing. The electric energy required in a specific example of a field intensity of $10^3$ volt per cm., an electrode spacing of $10^{-2}$ cm.$=0.1$ mm. which means, for an applied potential of 10 volts and for a specific resistance of 1000 ohm cm., amounts to less than 0.01 watt seconds per cm.$^2$ of control layer surface.

For practical application of the process of the invention, it is preferred to employ concentration changes occurring adjacent to membranes in colloidal systems to which an electric field is applied. Such a system has the following advantages:

(1) The amount of material transported per unit charge is particularly large;
(2) The mechanism of current transfer does not involve formation of a diffusion layer, such as in electrode processes, but charged colloidal particles are replaced by ions of equal charge which pass through the membrane;
(3) The mobility, that is, the speed per unit field strength, of colloidal particles is of the same order of magnitude as that of ions and may be modified by addition agents;
(4) The boundary layer at which concentration changes occur and which produce the electrooptic effect is spacedly separated from the electrode surfaces and any electrode reactions occurring there which may interfere with the electro-optic phenomenon;
(5) As a consequence of items 1 and 3 above, the electrical energy required for achieving a given optical effect is particularly small;
(6) Suitable choice of a membrane may enhance the electro-optic effect by electro-osmotic transfer of water.
(7) It is possible to use the electrode and the electrolyte in contact with the electrode as a source of electric potential so that under suitable conditions an external source of potential may not be required.

According to a preferred embodiment of the invention, the electric field employed for controlling a beam of light is an alternatingly reversing field, and is produced by a source of alternating potential. The alternating potential is adjusted so that the force of the electric field is equal in both directions in the absence of a controlling signal. The frequency and the amplitude of the alternating potential producing the electric field in the device of the invention may be selected in such a manner that the concentration changes required for the control effect are gradually developed during a plurality of cycles of the alternating potential. It is also possible to achieve a sufficient concentration change in a single cycle in the areas of maximum signal intensity so that practically conditions of total reflection are created. If the frequency of the alternating potential is greater than 20 cycles per second, the eye of an observer will perceive a light effect of average intensity which is determined by the local intensity of the incident controlling signal.

The amplitude of the alternating potential is adjusted for minimum conditions of total reflection or almost total reflection of the controlled beam in those areas of the control layer corresponding to maximum signal intensity. The signal may be provided by beams of visible light, by infra-red radiation, by X-rays, or by electron beams. Corresponding measures are taken, when the change in the optical properties of the control layer is visualized by other optical phenomena such as phase contrast, the schlieren effect, or optical interference phenomena.

Equipment suitable for performing the above-described preferred embodiment of the invention includes a pair of electrodes spacedly arranged for creating a light beam controlling field therebetween. The electrodes are connected to a source of alternating potential and the elements of the control system are so selected that an alternating current of symmetrical amplitude passes between the electrodes in the absence of a controlling signal.

When the device of the invention is to be employed for the amplification of an image, a layer of a semi-conductor or of a photoelectric semi-conductor is provided between the electrodes. The alternating potential applied to the electrodes is asymmetrical to such an extent that the current flowing in the absence of a controlling signal is symmetrical because of the rectifying effect of the semi-conductor layer which offers different resistance to the passage of current in different directions.

The device for image amplification is preferably equipped with means for independently adjusting the positive and negative half-wave of the alternating potential applied to the electrodes.

The photoelectric semi-conductive layer of the inventive device for image amplification is furthermore preferably separated from the membrane or electrode of the control system, upon which the beam of controlling radiation or light impinges by a layer of light-impermeable material.

It is a particular advantage of the preferred embodiment of the inventive device when employed for image amplification and image transformation that the dark-current of the semi-conductor layer is uniformly ineffective for all image elements independent of the intensity of the respective incident controlling signals so that only the current produced by the incidence of light on the photo-electric layer produces an effect. The arrangement described also affords better control, particularly for light signals of intermediate intensity and reduces the chemical polarization effects at the electrodes.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing, in which:

FIG. 4 shows a modification of the apparatus of FIG. 1; and

FIGS. 5-7 schematically represent potentials applied and currents flowing in the apparatus of FIG. 4.

Figure 1:
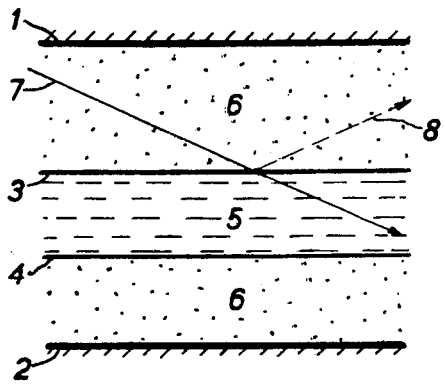
FIG. 1 is a somewhat schematic representation of a preferred embodiment of apparatus for performing the invention.

Referring now to the drawing, and more particularly to FIG. 1, there is shown an example of an embodiment of the invention utilizing changes in concentration induced by the process of the invention for altering the property of total reflection of a system. Two electrodes 1 and 2 of an inert material such as platinum are arranged at a distance of 5 cm. The space between the two electrodes 1, 2 is divided into three compartments of approximately equal thickness by two parallel collodion membranes 3 and 4.

The central compartment between the membranes is filled with a colloidal solution 5 consisting of a mixture of 100 parts of chlorobenzene, 100 parts of a 20% solution of sodium lauryl sulfate, and 10 parts of a 50% solution of methylamine hydrochloride, the dispersion medium being water. The particle size of the individual electrically charged droplets of the colloidal phase is such that the particles cannot pass through the membranes. The two compartments contained between a membrane and an electrode are filled with a saturated solution of silver nitrate 6. The refractive indices of the colloidal solution, of the saturated silver nitrate solution, and of the membranes are substantially equal at room temperature.

A light beam 7 enters the system at an angle of approximately 23° to the surface of the membrane 3. It normally passes through the membrane and the colloidal solution without any change in direction, as indicated by the solid line and arrow 1. The electrodes 1 and 2 may be connected to a source of electric potential such as a battery, electrode 1 being connected to the negative pole and electrode 2 to the positive pole, and a potential, approximately 25 volts, may be impressed upon the electrodes.

Since the colloidal particles of the afore-described solution are charged negatively, the colloidal particles migrate in a direction from membrane 3 towards membrane 4 so that the concentration of colloidal particles within the boundary layer adjacent membrane 3 decreases. The refractive index of the solution which originally was 1.445 is thereby reduced until it drops substantially to that of pure water, or a value of 1.33. As can readily be calculated from the laws of reflection, total reflection of a light beam entering the system at an angle of 23° to the surface of membrane 3 will occur when the thickness of the boundary layer of reduced concentration, that is, of the control layer, has reached the dimension of 1 wave length of the light of beam 7. Under the specific conditions of this experiment, total reflection of the light beam in the direction of dotted line and arrow 8 occurs within $10^{-4}$ seconds.

As long as the boundary layer of reduced concentration of colloidal particles has a thickness smaller than 1 wave length of the light beam, only a portion of the light impinging upon membrane 3 is reflected, the remaining light being transmitted through the colloidal system.

It will be appreciated that the afore-described device is not limited in any manner to any one specific combination of materials nor to any specific strength of the applied electric field. The necessary experimental conditions for any specific material may readily be determined from the considerations presented in the above general description of the invention.

The invention also is not limited to any specific conductive liquid such as a saturated silver nitrate solution to be arranged between membranes and electrodes. It is entirely possible to dispense completely with such an electrically conductive intermediate liquid and to superimpose the electrode 1 directly upon the membrane 3. It is evident that in such a case, the electrode 1 must be selected of a suitable transparent material such as electrically conductive glass.

It is furthermore contemplated to locate the electrode 2 directly in the colloidal solution 5 or in direct contact therewith when reactaions occurring on the electrode surface are either of such a nature as not to interfere with the electro-optic effect or can be eliminated by suitable additions to the solution.

When using the device illustrated in FIG. 1, it is preferred to choose the conductivity of the conductive solution 6 substantially greater than that of the colloidal solution 5 so that the potential drop across the system will occur largely within the colloidal solution.

It is possible to replace the conductive solution 6 by additional portions of the colloidal solution 5. In this case concentration changes will also occur at the electrode surfaces and at the membrane surfaces facing the electrodes. Such additional areas of concentration changes may equally be utilized for changing the direction of beams of light when an electric field is applied to the system.

When the index of refraction of the colloidal solution is initially smaller than that of the membrane 3 by a suitable value, the system will originally show total light reflection. When current is now applied in a direction inverse to that of the previous example, in that electrode 1 is connected to the positive pole of the source of current, the concentration of the dispersed material in the control layer and consequently the index of refraction of the control layer will be increased so as first to reduce and then practically to eliminate total reflection of light beam 7.

It is obvious that effects similar to those described above but of inverse direction can be produced with a dispersion in which the index of refraction of the dispersed material is smaller than that of the dispersion medium.

It is preferred to equip the colloidal solution 5 of FIG. 1 with means for accelerating diffusion in the control layer so as to restore the original condition thereof after exposure to an electric field. A suitable device for this purpose may comprise an ultrasonic transducer in effective contact with or immersed in the colloidal solution 5.

In a system of the afore-described type in which the concentration changes in the control layer produce or eliminate total reflection, it is possible to reduce total reflection practically to zero by means of the following arrangements:

(a) The index of refraction of the membrane (or transparent electrode) is chosen equal to that of the control layer when in condition for minimum reflection.

(b) The incident beam of light is polarized in a direction parallel to the plane of incidence. When viewed under the angle of polarization, the intensity of the reflected portion of the beam is zero, whereas under conditions of total reflection substantially the entire intensity of the beam is reflected.

(c) The incident light is linearily polarized. Reflected, linearly polarized light can be blocked completely by an optical analyzer system. Totally reflected light, however, is elliptically polarized, and largely passes through an optical analyzer system.

(d) Series arrangement of a plurality of individual electro-optic elements of the invention. If the residual reflection of the first element is, for example, 5% of the incident light when the system is arranged for transmission, series arrangement of three such elements will reduce the amount of light reflected to .0125%.

The concentration changes in the control layer may be made visible by many known devices and arrangements, utilizing the effects of phase contrast, of dark field illumination, or of the schlieren method. All these principles of operation and many devices based thereon being well known, a more detailed description is not necessary. All such devices have in common the basic feature of the invention that concentration changes produced in an electrical field and the changes in optical properties resulting therefrom are made visible by optical methods known in themselves. A few specific examples will be briefly discussed.

Silver electrodes are immersed in a silver nitrate solution which is practically saturated at room temperature. A beam of light is directed at a large angle of incidence against the submerged portion of an electrode. When current is made to pass between the electrodes, the beam is deflected by the diffusion layer formed along the electrode as if it were reflected by the layer.

When the electrodes consist of thin silver wires it is possible to measure the time delay between application of voltage and initial passage of current between the electrodes and inception of the electro-optic effect as being of the order of magnitude of less than $10^{-5}$ seconds.

Figure 2:
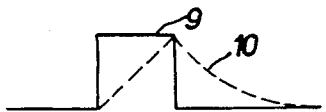
FIG. 2 shows an oscillogram illustrative of the electrooptic effect of the invention.

Convenient control of the direction of a light beam or of a portion thereof by influencing the lmiting angle of total reflection of a liquid system at its surface adjacent a semi-permeable membrane is achieved not only with chlorobenzene solubilized and colloidally dispersed in water as more fully discussed in connection with FIG. 1 of the drawing, but under otherwise similar conditions with many other colloidal solutions, such as an emulsion of polystyrene. An oscillogram obtained with a polystyrene emulsion is illustrated in FIG. 2 of the drawing.

Curve 9 represents electric field strength as a function of time. The duration of the electric pulse recorded was approximately 20 milliseconds, the field strength approximately 10 volts per cm. in the colloidal system. Curve 10 represents the intensity of the reflected light in arbitrary units as a function of time, light being measured by means of a conventional photoelectric cell. As can be seen from FIG. 2, the intensity of light linearly rises to a peak. When the electric potential is discontinued, the light intensity decays thereafter in a gradually flattening curve.

It is evident that such a device may serve as an electro-optic shutter for photographic purposes, and extremely short exposure times have actually been achieved with photographic devices employing such a shutter.

The electric field required to produce the electro-optic effect of the invention may be triggered or altered by a variety of devices, which may be known per se, and which may be based on mechanical, magnetic, electromagnetic, or thermoelectric effects. The electric field may also be triggered, controlled or produced by changes in the electric properties of semi-conductors under the influence of electromagnetic or corpuscular radiation. Electrons or ions may transmit energy to such semi-conductors to alter their electrical resistivity or their photoelectric potential. Similarly, electromagnetic radiation (X-rays, ultraviolet, visible, or infra-red light) may produce changes in an electric field to actuate the electro-optic system of the invention.

Figure 3:
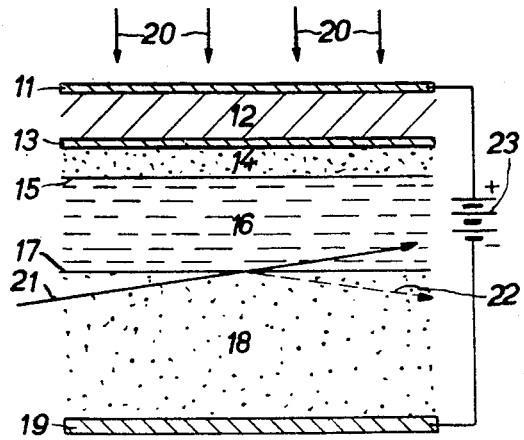
FIG. 3 shows a modification of the device of FIG. 1.

An embodiment of such an arrangement is illustrated somewhat schematically in FIG. 3 of the drawing. A beam of radiation 20 (electrons, light) is transmitted through a conductor 11 which is transparent thereto to a semi-conductor layer 12, the resistance of which changes when subjected to such a radiation. The changes of potential thus generated on the surface of semi-conductive layer 12 opposite conductor 11 are transmitted to a contiguously adjacent electrode 13 which is part of an electro-optic system analogous to that illustrated in FIG. 1 and also comprising a conductive electrolyte solution 14, such as an saturated silver nitrate solution, a membrane 15 which may be of collodion, a colloidal solution 16 containing chlorobenzene or polystyrene as the dispersed phase, a membrane 17 along the surface of which the control layer is developed when an electric potential is applied to the system, another body of electrolyte 18, and a second electrode 19.

This device operates in a manner analogous to that of FIG. 1. The beam of radiation 20 causes the potential across the control layer at membrane 17 to vary so that light beam 21 is either permitted to pass in direction of the fully drawn line or is partially or entirely reflected in the direction of dotted line 22.

The potential controlled by semi-conductor 12 may originate in a battery 23 or any similar source of voltage, the two poles of which are connected respectively to conductor 11 and electrode 19. When the primary radiation which controls the intensity of the reflected beam 22 is an electron beam, the conductor 11, semi-conductor 12, electrode 13, and voltage source 23 may be eliminated. The accelerating voltage for the electron beam 20 is then applied to the source of electrons such as a hot cathode and the electrode 19. The current is carried across the dispersed system 16 by the electrons of the beam 20.

With the device illustrated in FIG. 3, it is possible to amplify the electron beam and to permit the controlling current, that is, the current which controls the intensity of the reflected beam 22 by means of the control layer, to flow for a longer period than the primary beam of electrons 20. This means that it is possible to store an electron image which further leads to effective image amplification. It is evident that an image of electromagnetic radiation may be stored in an analogous manner by means of the semi-conductor layer 12.

In order to amplify an actual image composed of a plurality of dots of varying light intensity, the device illustrated in FIG. 3 has to be dimensioned in such a manner that the component of the electric field which is parallel to the surface of membrane 17 be as small as possible in the region between conductor 11 and membrane 17. This can be achieved by making elements 12, 13, 14 and 16 as thin as possible and to make the electric field between conductor 11 and electrode 19 substantially homogeneous.

Amplification of a composite image may also be achieved by employing a plurality of separate elements each substantially identical with the system of FIG. 3 and arranging such elements in parallel whereby the image produced consists of a plurality of dots each representing the light beam 22 of an individual electro-optic system. Such an arrangement prevents decay of concentration gradients produced along a single membrane 17 by an electric field, the intensity of which varies along the membrane because of transverse intensity variations in the original beam 20. The degree of optical resolution obtainable by a multi-element electro-optic system of the invention is determined by the size of the individual elements and may be varied at will within rather wide limits. The intensity of the dots produced by the individual reflected beams 22 may be controlled by the strength of the electric field as described above or, at constant strength, by the portion of the time during which the controlling current is permitted to flow, as evident from FIG. 2.

Referring now to FIG. 4, there is shown a mosaic plate electrode 13' and a membrane 17 defining therebetween a space subdivided in a mosaic pattern by partitions 24 of insulating material and containing a colloidal solution 16 which may be the same as that described in connection with FIG. 3 above. The colloidal particles of the solution 16 are electrically charged. An electrode 19 is spaced from the membrane 17 on the side opposite the mosaic plate electrode 13'. The space between the electrode 19 and the membrane 17 is filled by a conductive solution 18 which may also be of a colloidal nature. In order to prevent optical effects which may occur at the underside of the membrane 17 because of migration of the colloidal particles of the solution 18 in an electric field, the colloidal particles of the solution 18 are preferably charged with a substantially stronger electric charge than the colloidal particles of the solution 16. Any concentration change occurring on the underside of the membrane 17 will therefore be substantially smaller than those on the upper side of the membrane where concentration changes are intended to be employed for control of a light beam.

It will be understood that the solutions 16 and 18 can also be interchanged and that in that case concentration variations on the underside of the membrane 17 are employed for control of a light beam. Alternatively, the arrangement may be such that the entire space between the mosaic plate electrode 13' and the electrode 19 is filled by a solution of the type of solution 16. In this case, the concentration changes occurring directly at the mosaic plate electrode 13' are employed for control of a light beam.

A layer 12 of a photoelectric semi-conductor the resistance of which varies under the influence of an incident beam of light or a semi-conductor, the electrical resistance of which varies under the influence of an incident beam of electrons is arranged on the electrode 13' and is covered with a thin transparent conducting layer 11.

A source of alternating current 30 is connected with the electrodes 19 and 11 by a circuit which includes a switch 29 and two variable resistors 31, 32 arranged in parallel and each equipped with a respective movable contact 33, 34. The variable resistors 31 and 32 are arranged in series with respective rectifier elements 35 and 36 which are oppositely polarized so that the amplitude of one of the half-waves of the alternating current flowing through the system may be adjusted by varying the position of the movable contact 33, and the amplitude of the other half-wave by varying the position of the movable contact 34.

An image-producing beam of light 20 produces on the photoelectric semi-conductive layer 12 the projected image which it is desired to amplify. The arrow 21 indicates a beam of light coming from a source of secondary light (not shown). The beam 21 is controlled by the afore-described device in a manner indicated in connection with the description of FIG. 1.

The indices of refraction of the solution 18, of the membrane 17, and of the colloidal solution 16 are of equal magnitude so that the beam 21 enters the colloidal solution 16 without refraction or reflection in the absence of an external electric field in the solutions 16 and 18. The direction of the continuing beam is indicated by the arrows 21'. When an electric field of appropriate polarity is applied to the electrode 13' and the membrane 17, colloidal particles will migrate from a control layer contiguously adjacent the membrane 17 towards the electrode 13' so that the concentration of the colloidal particles will decrease in the control layer. With a suitably selected colloidal material the index of refraction now will be reduced. The beam 21 impinging upon a medium of lower refractive index after passing through the membrane 17 will therefore be totally reflected as indicated by the arrow 22. Depending upon the thickness of the layer of reduced concentration immediately adjacent the membrane 17, the reflection of the light may be only partial.

The electric field required for producing concentration changes in the layer of liquid above the membrane 17 is produced by the application of an electric potential to the electrodes 19 and 11 and by the effect of light on the photoelectric semi-conductor layer 12.

Since the electrode 13' and the solution 16 are subdivided in a mosaic pattern, the current flows between the electrode 13' and the membrane 17 in a plurality of conducting elements the cross section of which depends on the size of the elements of the mosaic electrode. The intensity of the current in the individual conducting elements depends among other variables on the resistance of the photoelectric semi-conductor layer 12 and thus on the intensity of the light providing the controlling signal and incident upon the area of the photoelectric semi-conductor layer 12 corresponding to the element of the mosaic plate electrode 13'. The current distribution over the membrane 17 thus corresponds to the distribution of the intensity of light incident on the layer of photoelectric semi-conductor material. The subdivision of the solution 16 in a mosaic pattern has the particular purpose of preventing scattering of the current flow in a lateral direction. Such lateral scattering of the current may also be reduced by making the distance between the electrode 13' and the membrane 17 as small as possible.

If a symmetrical alternating potential is applied to the electrodes 19 and 11, the alternating current flowing through the system in the absence of a light beam incident on the photoelectric semi-conductor layer 12 is an asymmetrical because of the substantial differences in conductivity of the semi-conductor layer in the two directions of the current flow. By suitably positioning the movable contacts 33 and 34 according to the diode characteristics of the semi-conductor layer 12 the alternating potential applied to the electrodes 19 and 11 may be deformed in such a manner that the alternating current flowing through the system in the absence of external light is symmetrical. The alternating potential applied to the electrodes 11 and 19 with proper adjustment of the variable resistors 31 and 32 is indicated in FIG. 5. The resulting symmetrical alternating current is shown in FIG. 6 in a diagrammatic manner.

Since the dark current, that is the current flowing through the system of the inventive device in the absence of external light is symmetrical, the migration effect produced in the colloidal solution 16 adjacent the membrane 17 by one half-wave of the dark current is cancelled by the subsequent other half-wave of the dark current.

When the frequency of the dark current is sufficiently high, no significant concentration changes will occur in the layer of the colloidal solution 16 adjacent membrane 17. The light beam 21 which is to be controlled by the device thus will pass through the membrane 17 into the colloidal solution 16 and will not be reflected.

If the photo-electric semi-conductor layer 12 is exposed to light, the resistance of the layer is changed in the lighted areas corresponding to the intensity of the incident light. The alternating current flowing through the corresponding conductor element thus becomes asymmetrical as shown in FIG. 7. The migration effects produced by the unequal half-waves of the alternating current in the layer of the colloidal solution 16 adjacent the membrane 17 therefore no longer cancel each other so that a substantial change of concentration of the colloidal material occurs near the membrane 17 in the colloidal solution 16. In the example illustrated above, the concentration of the colloidal particles in the control layer is decreased. The beam of light which falls upon that area of the membrane 17 which is controlled by the corresponding current element is therefore reflected. A beam of light directed against the membrane 17 in the direction of the arrows 21 is thus controlled corresponding to the distribution of intensity of the beam of light 20.

By making the beam 21 of different nature, wave length, or intensity from the beam 20, the device of the invention may be operated as an image transformer or amplifier.

The concentration change produced in the solution adjacent the membrane 17 by a single half-wave is relatively small when the force of the electrical field is small so that the concentration changes required for controlling the beam of secondary light 21, that is for its reflection on a control layer adjacent the membrane 17, is developed only after a plurality of periods of the alternating current. When the image to be amplified is of sufficient quality, the amplitude of the alternating potential may be reduced to the point that the secondary light beam 21 is just totally reflected or almost totally reflected in that portion of the membrane 17 which corresponds to the area of the photoelectric semi-conductor layer 12 which is exposed to the greatest intensity of the projected image. With this mode of operation, the intermediate light values of the image to the amplified are particularly well reproduced.

At least one of the several layers 13', 24, 16, interposed between the photoelectric semi-conductor layer 12 and the membrane 17 upon which a light beam to be controlled is directed is preferably of light-impermeable material in order to prevent any transmission of light from the beam 21 from the membrane 17 through the photoelectric semi-conductor layer 12. In order to prevent any such effect, it is preferred to introduce an additional layer of light absorbing material between the photoelectric layer 12 and the membrane 17. Such a modification is not shown in FIG. 4.

It will be obvious to those versed in the art that alternating current may be employed with the device of the invention not only for the purpose of image amplification, but also in various other devices for which the device illustrated in FIG. 4 may be employed, such as in image transformers employed for transforming an electron-optical image into an optical image. In this case, the semi-conductor layer 12 is to be replaced by a semi-conductor layer the resistance of which varies under the influence of an incident beam of electrons. The electrode 11 then must be of a material permeable to electrons such as a thin layer of metal produced by vacuum deposition or a wire gauze electrode.

Operation of the device illustrated in FIG. 4 is predicated on a certain rectifying effect of the semi-conductor or photoelectric semi-conductor layer 12. If it is desired to employ such a semi-conductor layer which is not in itself a rectifier, a rectifying film may be arranged in the circuit and preferably between the electrode 11 and the layer of photoelectric semi-conductor 12 or between the semi-conductor 12 and the mosaic plate electrode 13'.

Numerous arrangements will readily suggest themselves to one skilled in the art for transforming or amplifying the produced image. All such arrangements will have the common feature of transforming the primary image into corresponding variations of electric current or electric voltage whereby the propagation of the light beam produced by a secondary source of light, such as beam 21 of FIG. 3 or 4 is controlled.

The electro-optic system for controlling the propagation of a light beam may be employed in many fields of optical image formation of which the following are merely representative:

(1) A photographic shutter permitting exposure times as short as, for example, $10^{-5}$ seconds. When the electro-optic system of the invention is used, it may, for example, replace the mechanically actuated elements of the shutter. A control layer of the invention is interposed between an objective and a light-sensitive image-recording layer. If such a camera is equipped with a photoelectric cell employed in a known manner for controlling exposure of the light-sensitive image-recording layer, the output voltage of the photoelectric device can be employed to control the potential applied to the electrodes of the inventive device for controlling exposure.

(2) Control of the intensity of a recording light beam in the optical recording of the sound track of a sound film or the like.

(3) A stroboscopic source of light of great intensity not requiring any mechanically movable elements. Any desired primary source of light may be used in such an arrangement.

(4) Amplification of an image produced by visible light, for example, for purposes of image projection.

(5) Image amplification and wave length transformation for infra-red light whereby an infra-red image may be amplified and/or transformed into a visible image of the same or different intensity.

(6) Image amplification and wave length transformation of an X-ray image, for example, for the purposes of medical fluoroscopy or X-ray examination, or for the X-ray examination of materials of construction or the like.

(7) Image amplification and wave length transformation of ultraviolet light, for example, for the purposes of ultraviolet microscopy.

(8) Image transformation and amplification of electron images, for example, for the purposes of electron microscopy.

(9) Image transformation of images produced by the radiation of radioactive isotopes.

(10) Image storage of the recording of images of extremely short duration. An image of a duration as short as, for example, $10^{-5}$ seconds may be stored for an extended period such as, for example, 1 second and may be recorded photographically with such an extended exposure time.

(11) For projection of a television image. The primary image produced by a beam of electrons in the manner of a conventional television tube may be transformed into a visible image by one or several systems analogous to that of FIG. 3 or 4 discussed above which visible image then may be projected to any desired screen size with any desired intensity of light. The electro-optic system of the invention may also be employed in conjunction with a conventional television receiver and has the following advantages:

(a) It eliminates the necessity for the very high voltages required at a conventional television tube.
(b) There is no need for a large evacuated picture tube. A screen diameter as small as 5 cm. is sufficient.
(c) The brightness and size of the picture can be increased substantially beyond what can be achieved with conventional picture tubes.
(d) The accident hazards inherent in a large evacuated element and in high voltage are eliminated.
(e) The cost of producing a television system including the electro-optic feature of the invention is substantially reduced.

(12) Color television receivers. It is possible to project and superimpose the three color components of a transmitted color television image by three image tubes embodying the electro-optic system of the invention using either three sources of light of different color or a single source of light and suitable interposed optical filters between the source of light and the respective control layers of the three image tubes.

Such an arrangement has the advantages of eliminating the need for special color-sensitive picture tubes in color television reception and of permitting a better gradation of color values than is possible in the usual color transmission systems. Obviously, such a color system would also enjoy all the advantages of the monochrome television system of the invention enumerated under item 11 above.

(13) Visulization of ultrasonic waves for such purposes as the examination of materials of construction. Such ultrasonic waves may be employed for accelerating the decay of concentration gradients in a control layer which are produced by a pulsed electric field.

(14) As a light relay for the purposes of telegraphic picture transmission.

It will be understood that each of the elements described above, or two or more together, may also find a useful application in other types of electro-optic systems differing from the type described above.

While the invention has been illustrated and described as embodied in a number of specific applications, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A device for varying a beam of light in accordance with variations of an electric field, comprising, in combination, a body of electrically conductive liquid containing medium including a component having an index of refraction different from that of the remainder of said liquid and having the characteristic of migrating in said liquid from one point thereof toward another point when said body of medium is exposed to an electric field whereby the concentration of said component is changed in at least a portion of said medium, said portion of said medium having a boundary surface adapted to be exposed to light; means for exposing said body to an electric field; and means for directing a beam of light at an obtuse incident angle against said boundary surface a portion of said body of conductive liquid containing medium the overall index of refraction of which portion changes due to a change of concentration of said component in said portion caused by migration of said component in said medium when said body is exposed to an electric field, whereby upon exposure of said body to an electric field the direction of said beam of light at the point of impingement on said boundary surface will be varied.

2. A device for varying the direction of a beam of light in accordance with variations of an electric field, comprising, in combination, a body of electrically conductive liquid including a component having an index of refraction different from that of the remainder of said liquid and having the characteristic of migrating in said liquid from one point thereof toward another point when said body of liquid is exposed to an electric field whereby the concentration of said component is changed in at least a portion of said liquid, said portion of said liquid having a boundary surface adapted to be exposed to light; means for exposing said body to an electric field for causing migration of said component in said liquid so as to change the overall index of refraction of a portion of said body from one value to another value due to a change of concentration of said component in said portion; and means for directing a beam of light at an angle of incidence which is not smaller than the limiting angle of total reflection against said boundary surface of said portion of said body of conductive liquid the index of refraction of which portion changes due to a change of concentration of said component in said portion caused by migration of said component in said liquid when said body is exposed to an electric field, whereby upon exposure of said body to an electric field the direction of said beam of light at the point of impingement on said boundary surface will be varied between the limits of total reflection and total transmission thereof by said portion.

3. A device for varying the direction of a beam of light in accordance with variations of an electric field, comprising, in combination, a body of electrically conductive liquid including a component having an index of refraction different from that of the remainder of said liquid and having the characteristic of migrating in said liquid from one point thereof toward another point when said body of liquid is exposed to an electric field; means for exposing said body to an electric field, said means including a photo-electric element sensitive to a first beam of light so as to vary the magnitude of an electric potential, and means for applying said potential to said field; and means for directing a second beam of light against a portion of said body of conductive liquid the overall index of refraction of which portion changes by migration of said component in said liquid when said body is exposed to an electric field, whereby upon exposure of said photo-electric element to said first beam of light the direction of said second beam of light will be changed.

4. A device for varying the direction of a beam of light in accordance with variations of an electric field, comprising, in combination, a body of electrically conductive liquid including a component having an index of refraction different from that of the remainder of said liquid and having the characteristic of migrating in said liquid from one point thereof toward another point when said body of liquid is exposed to an electric field; means for exposing said body to an electric field, said means including an element sensitive to energy of radiation so as to vary the magnitude of an electric potential, and means for applying said potential to said field; and means for directing a beam of light against a portion of said body of conductive liquid the overall index of refraction of which portion changes by migration of said component in said liquid when said body is exposed to an electric field, whereby upon exposure of said element to said energy of radiation the direction of said beam of light will be changed.

5. A device for varying the direction of a beam of light in accordance with variations of an electric field, comprising, in combination, a body of electrically conductive liquid including a component having an index of refraction different from that of the remainder of said liquid and having the characteristic of migrating in said liquid from one point thereof toward another point when said body of liquid is exposed to an electric field; means for selectively exposing said body to an electric field; means for accelerating diffusion in said body of liquid for restoring the original condition thereof after exposure to an electric field; and means for directing a beam of light against a portion of said body of conductive liquid the overall index of refraction of which portion changes by migration of said component in said liquid when said body is exposed to an electric field, whereby upon exposure of said body to an electric field the direction of said beam of light will be changed and may be restored thereafter to the original direction by accelerated diffusion.

6. A device for varying the direction of a beam of light in accordance with variations of an electric field, comprising, in combination, a body of electrically conductive liquid including a component having an index of refraction different from that of the remainder of said liquid and having the characteristic of migrating in said liquid from one point thereof toward another point when said body of liquid is exposed to an electric field; means for selectively exposing said body to an electric field; ultrasonic means for accelerating diffusion in said body of liquid for restoring the original condition thereof after exposure to an electric field; and means for directing a beam of light against a portion of said body of conductive liquid the overall index of refraction of which portion changes by migration of said component in said liquid when said body is exposed to an electric field, whereby upon exposure of said body to an electric field the direction of said beam of light will be changed and may be restored thereafter to the original direction by accelerated diffusion.

7. A device for varying the direction of a beam of light in accordance with variations of an electric field, comprising, in combination, two spaced electrode means; a body of electrically conductive liquid arranged intermediate said electrode means and conductively connected thereto, said liquid including a component having an index of refraction different from that of the remainder of said liquid and having the characteristic of migrating in said liquid from one point thereof toward another point when said body of liquid is exposed to an electric field, whereby the concentration of said component is changed in at least a portion of said liquid, said portion of said liquid having a boundary surface adapted to be exposed to light; means for applying an electric potential to said electrode means so as to produce an electric field therebetween in said body, a surface of said body conductively facing one of said electrodes; and means for directing a beam of light against said boundary surface of said body of conductive liquid the overall index of refraction of which along said surface changes due to change of concentration of said component in said portion caused by migration of said component in said liquid when said body is exposed to an electric field, whereby upon exposure of said body to an electric field the direction of said beam of light at the point of impingement on said boundary surface will be changed.

8. A device for varying the direction of a beam of light in accordance with variations of an electric field, comprising, in combination, two spaced electrode means; a semi-permeable membrane arranged intermediate said electrode means; a body of electrically conductive liquid arranged intermediate said membrane and one of said electrode means and another body of a conductive liquid arranged intermediate said membrane and the other one of said electrode means, said first-mentioned liquid including a component having an index of refraction different from that of the remainder of said liquid, being incapable of passing through said membrane and having the characteristic of migrating in said liquid from one point thereof toward another point when said body of liquid is exposed to an electric field; means for applying an electric potential to said electrode means so as to produce an electric field therebetween in said first-mentioned body of liquid; and means for directing a beam of light against a portion of said first-mentioned body of liquid adjacent said membrane the overall index of refraction of which surface changes by migration of said component in said liquid when said body is exposed to an electric field, whereby upon exposure of said body to an electric field the direction of said beam of light will be changed.

9. A device for varying the direction of a beam of light in accordance with variations of an electric field, comprising, in combination, two electrode means; two semi-permeable membranes spacedly interposed between said electrode means, a first body of a first electrically conductive liquid arranged intermediate said membranes and contacting the latter, said liquid including a component incapable of passage through said membranes, having an index of refraction different from that of the remainder of said liquid and having the characteristic of migrating in said liquid from one point thereof toward another point when said body of liquid is exposed to an electric field; a second and third body of a second and third respective electrically conductive liquid arranged respectively between one of said membranes and one of said electrode means and contacting said respective membranes and electrode means; means for applying a potential to said electrode means so as to produce an electric field in said first body of liquid; and means for directing a beam of light against a portion of said first body of conductive liquid the overall index of refraction of which portion changes by migration of said component in said first liquid when said body is exposed to an electric field, whereby upon exposure of said body to an electric field the direction of said beam of light will be changed.

10. A device as set forth in claim 9, in which said first liquid is an aqueous dispersion of chlorobenzene.

11. A device for varying the direction of a beam of light in accordance with variations of an electric field, comprising, in combination, two electrode means; two semi-permeable membranes spacedly interposed between said electrode means, a first body of a first electrically conductive liquid arranged intermediate said membranes and contacting the latter, said liquid including a component incapable of passage through said membranes, having an index of refraction different from that of the remainder of said liquid and having the characteristic of migrating in said liquid from one point thereof toward another point when said body of liquid is exposed to an electric field; a second and third body of a second and third respective electrically conductive liquid arranged respectively between one of said membranes and one of said electrode means and contacting said respective membranes and electrode means; means for applying a potential to said electrode means so as to produce an electric field in said first body of liquid, said means including an element sensitive to energy of radiation so as to vary the magnitude of an electric potential, said element being conductively superimposed on one of said electrode means for applying said potential thereto; and means for directing a beam of light against a portion of said first body of conductive liquid the overall index of refraction of which portion changes by migration of said component in said first liquid when said body is exposed to an electric field, whereby upon exposure of said body to an electric field the direction of said beam of light will be changed.

12. A device for varying the direction of a beam of polarized light in accordance with variations of an electric field, comprising, in combination, a body of electrically conductive liquid including a component having an index of refraction different from that of the remainder of said liquid and having the characteristic of migrating in said liquid from one point thereof toward another point when said body of liquid is exposed to an electric field; means for exposing said body to an electrical field whereby the concentration of said component is changed in at least a portion of said liquid, said portion of said liquid having a boundary surface adapted to be exposed to light; and means for directing a beam of polarized light at an obtuse incident angle against said boundary surface of said portion of said body of conductive liquid the overall index of refraction of which portion changes due to a change of concentration of said component in said portion caused by migration of said component in said liquid when said body is exposed to an electric field, whereby upon exposure of said body to an electric field the direction of said beam of polarized light at the point of impingement on said boundary surface will be changed.

13. A device for varying the direction of a beam of light in accordance with variations of an electric field, comprising, in combination, a body of electrically conductive liquid including a component having an index of refraction different from that of the remainder of said liquid and having the characteristic of migrating in said liquid from one point thereof toward another point when said body of liquid is exposed to an electric field whereby the concentration of said component is changed in at least a portion of said liquid, said portion of said liquid having a boundary surface adapted to be exposed to light; means for exposing said body to an electric field produced by a flow of electrically charged particles; and means for directing a beam of light against said boundary surface of said portion of said body of conductive liquid the overall index of refraction of which portion changes due to a change of concentration of said component in said portion caused by migration of said component in said liquid when said body is exposed to an electric field, whereby upon exposure of said body to an electric field the direction of said beam of light at the point of impingement on said boundary surface will be changed.

14. A device for varying a beam of light in accordance with variations of an electric field, comprising, in combination, a body of electrically conductive liquid containing medium including a component having an index of refraction different from that of the remainder of said medium and having the characteristic of migrating in said medium from one point thereof toward another point when said body of medium is exposed to an electric field whereby the concentration of said component is changed in at least a portion of said liquid; means for exposing said body to an electric field; and means for directing a beam of light against said boundary surface of said control layer of said body of conductive medium, the index of refraction of said control layer changing due to a change of concentration of said component in said portion caused by migration of said component in said medium when said body is exposed to said electric field, whereby upon exposure of said body to said electric field the direction of said beam of light at the point of impingement on said boundary surface will be varied in accordance with the variation of the index of refraction of said control layer.

15. A device for controlling the propagation of a beam of light comprising, in combination, a body of electrically conductive liquid containing material including a component having an index of refraction different from that of the remainder of said material and having the characteristic of migrating in said material from one point thereof toward another point so as to change the concentration of said component at said points when an electric current is passed through said material a portion of said body having a boundary surface adapted to be exposed to light; means for passing an electric current through said body; and means for directing a beam of light against said boundary surface of said portion of said body of conductive material the overall index of refraction of which portion changes by migration of said component in said material and the resulting change of the concentration of said component when current is passed through said body, whereby the propagation of said beam of light may be controlled by passage of said current through said body.

16. A device for controlling the propagation of a beam of light comprising, in combination, a body of electrically conductive liquid containing material including a component having an index of refraction different from that of the remainder of said material and having the characteristic of migrating in said material from one point thereof toward another point in a predetermined direction so as to change the concentration of said component at said points when an electric current is passed through said material in one direction, and of migrating in a direction opposite to said predetermined direction when current is passed through said material in a direction opposite to said one direction; means for passing an alternating electric current through said body; means for varying the ratio of the positive and of the negative amplitude of said alternating current; and means for directing a beam of light against a portion of said body of conductive material the overall index of refraction of which portion changes by migration of said component in said material and the resulting change of the concentration of said component when alternating current of different positive and negative amplitude is passed through said body, whereby the propagation of said beam of light may be controlled by varying the ratio of the positive and of the negative amplitude of said current through said body.

17. A device for controlling the propagation of a beam of light comprising, in combination, a body of electrically conductive liquid containing material including a component having an index of refraction different from that of the remainder of said material and having the characteristic of migrating in said material from one point thereof toward another point in a predetermined direction so as to change the concentration of said component at said points when an electric current is passed through said material in one direction, and of migrating in a direction opposite to said predetermined direction when current is pased through said material in a direction opposite to said one direction; a source of alternating electric potential; a semi-conductor member in circuit with said body and said source of potential, said semi-conductor member being sensitive to incident radiation for asymmetrically varying the resistance of said circuit to the respective passage of the positive and negative half-waves of an electric current produced in said circuit by said source of potential; means for varying the ratio of the positive and of the negative amplitude of said alternating current; and means for directing a beam of light against a portion of said body of conductive material the overall index of refraction of which portion changes by migration of said component in said material and the resulting change of the concentration of said component when alternating current of different positive and negative amplitude is passed through said body, whereby the propagation of said beam of light may be controlled by radiation incident on said semi-conducting member.

18. A device for controlling the popagation of a beam of light comprising, in combination, a body of electrically conductive liquid containing material including a component having an index of refraction different from that of the remainder of said material and having the characteristic of migrating in said material from one point thereof toward another point in a predetermined direction so as to change the concentration of said component at said points when an electric current is passed through said material in one direction, and of migrating in a direction opposite to said predetermined direction when current is passed through said material in a direction opposite to said one direction; a source of alternating electric potential; a semi-conductor member in circuit with said body and said source of potential, said semi-conductor member being sensitive to incident electromagnetic radiation for asymmetrically varying the resistance of said circuit to the respective passage of the positive and negative half-waves of an electric current produced in said circuit by said source of potential; means for varying the ratio of the positive and of the negative amplitude of said alternating current; and means for directing a beam of light against a portion of said body of conductive material the overall index of refraction of which portion changes by migration of said component in said material and the resulting change of the concentration of said component when alternating current of different positive and negative amplitude is passed through said body, whereby the propagation of said beam of light may be controlled by radiation incident on said semi-conducting member.

19. A method of controlling the propagation of a beam of light in accordance with variations of an electric field, comprising the steps of directing said beam of light against a boundary surface, adapted to be exposed to light, of a portion of a body of electrically conductive liquid containing material including a component having an index of refraction different from that of the remainder of said material and having the characteristic of migrating in said material from one point thereof toward another point so as to change the concentration of said component at said points when said body of material is exposed to an electric field; and causing migration of said component in said material in a predetermined direction by exposing said body to an electric field so that the overall index of refraction of said portion is changed due to a change of concentration of said component in said portion and the propagation of said beam of light is controlled.

20. A method of controlling the propagation of a beam of light in accordance with variations of an electric field, comprising the steps of directing said beam of light against a boundary surface, adapted to be exposed to light, of a portion of a body of electrically conductive liquid including a component having an index of refraction different from that of the remainder of said liquid and having the characteristic of migrating in said liquid from one point thereof toward another point so as to change the concentration of said component at said points when said body of liquid is exposed to an electric field; and causing migration of said component in said liquid in a predetermined direction by exposing said body to an electric field so that the overall index of refraction of said portion is changed due to a change of concentration of said component in said portion and the propagation of said beam of light is controlled.

21. A device for controlling the propagation of a beam of light in accordance with variations of an electric field; comprising, in combination, a body of electrically conductive liquid containing medium including a component adapted to vary the index of refraction of the remainder of said liquid containing medium and having the characteristic of migrating in said liquid containing medium in a direction from one point thereof toward another point when said medium is exposed to an electric field whereby the concentration of said component is changed in at least a portion of said medium, said portion of said liquid having a boundary surface adapted to be exposed to light; means for exposing said body to an electric field of variable strength; and means for directing a beam of light against said boundary surface of said portion of said body of liquid containing medium the index of refraction of which portion changes due to a change of concentration of said component in said portion caused by migration of said component in said medium when said body is exposed to said electric field, in such a manner that the ratio between a first intensity of a first fraction of said beam crossing said portion of said body, on one hand, and a second intensity of a second fraction of said beam reflected at said boundary surface, on the other hand, is controlled, by the exposure of said body to said field of variable strength, between conditions depending on said strength of said field, a reduction of said field strength toward a minimum resulting in decreasing one of said intensities toward a minimum including zero and in increasing the other intensity toward a predetermined maximum, and an increase of said field strength toward a maximum resulting in increasing said one intensity toward a predetermined maximum and in decreasing said other intensity toward a minimum including zero.

22. A device for controlling the propagation of a beam of light in accordance with variations of an electric field, comprising, in combination, a body of electrically conductive liquid containing medium including a component adapted to vary the index of refraction of the remainder of said liquid containing medium and having the characteristic of migrating in said liquid containing medium in a direction from one point thereof toward another point when said medium is exposed to an electric field whereby the concentration of said component is changed in at least a portion of said medium; means for exposing said body to an electric field of variable strength, said means including a photo-electric element sensitive to a first beam of light so as to vary the magnitude of an electric potential, means for applying said first beam of light to said photo-electric element and means for applying said potential to said field so as to vary the strength of the latter; and means for directing a second beam of light against a boundary surface of said portion of said body of liquid containing medium the index of refraction of which portion changes due to a change of concentration of said component in said portion caused by migration of said component in said medium when said body is exposed to said electric field, in such a manner that the ratio between a first intensity of a first fraction of said second beam crossing said portion of said body, on one hand, and a second intensity of a second fraction of said second beam reflected at said boundary surface, on the other hand, is controlled, by the exposure of said body to said field of variable strength, between conditions depending on said strength of said field, a reduction of said field strength toward a minimum resulting in decreasing one of said intensities toward a minimum including zero and in increasing the other intensity toward a predetermined maximum, and an increase of said field strength toward a maximum resulting in increasing said one intensity toward a predetermined maximum and in decreasing said other intensity toward a minimum including zero.

23. A device for controlling the propagation of a beam of light in accordance with variations of an electric field, comprising, in combination, a body of electrically conductive liquid containing medium including a component adapted to vary the index of refraction of the remainder of said liquid containing medium and having the characteristic of migrating in said liquid containing medium in a direction from one pont thereof toward another point when said medium is exposed to an electric field whereby the concentration of said component is changed in at least a portion of said medium; means for exposing said body to an electric field of variable strength, said means including an element sensitive to radiation energy so as to vary the magnitude of an electric potential, means for applying said radiation energy to said photo-electric element and means for applying said potential to said field so as to vary the strength of the latter; and means for directing a beam of light against a boundary surface of said portion of said body of liquid containing medium the index of refraction of which portion changes due to a change of concentration of said component in said portion caused by migration of said component in said medium when said body is exposed to said electric field, in such a manner that the ratio between a first intensity of a first fraction of said beam crossing said portion of said body, on one hand, and a second intensity of a second fraction of said beam reflected at said boundary surface, on the other hand, is controlled, by the exposure of said body to said field of variable strength, between conditions depending on said strength of said field, a reduction of said field strength toward a minimum resulting in decreasing one of said intensities toward a minimum including zero and in increasing the other intensity toward a predetermined maximum, and an increase of said field strength toward a maximum resulting in increasing said one intensity toward a predetermined maximum and in decreasing said other intensity toward a minimum including zero.

References Cited in the file of this patent
UNITED STATES PATENTS

| | | |
|---|---|---|
| 1,770,535 | Sukumlyn | July 15, 1930 |
| 1,923,891 | Skaupy | Aug. 22, 1933 |
| 2,915,943 | Brown et al. | Dec. 8, 1959 |

FOREIGN PATENTS

| | | |
|---|---|---|
| 674,294 | Germany | Apr. 12, 1939 |